United States Patent
Yang et al.

(10) Patent No.: US 8,313,384 B2
(45) Date of Patent: Nov. 20, 2012

(54) TRANSMISSION DEVICE HAVING OVERLOAD PROTECTION

(75) Inventors: Song-Ling Yang, Shenzhen (CN); Jin-Shi Lai, Shenzhen (CN)

(73) Assignees: Hong Fu Jin Precision Industry (ShenZhen) Co., Ltd., Shenzhen, Guangdong Province (CN); Hon Gai Precision Industry Co., Ltd., Tu-Cheng, New Taipei (TW)

( * ) Notice: Subject to any disclaimer, the term of this patent is extended or adjusted under 35 U.S.C. 154(b) by 423 days.

(21) Appl. No.: 12/569,858

(22) Filed: Sep. 29, 2009

(65) Prior Publication Data

US 2011/0009198 A1  Jan. 13, 2011

(51) Int. Cl.
*F16D 7/02* (2006.01)
*F16D 3/52* (2006.01)

(52) U.S. Cl. .................................. 464/37; 464/41

(58) Field of Classification Search ............. 464/40, 464/41, 43, 44, 30, 37
See application file for complete search history.

(56) References Cited

U.S. PATENT DOCUMENTS

| | | | | |
|---|---|---|---|---|
| 1,384,173 A | * | 7/1921 | Ragnar | |
| 3,319,484 A | * | 5/1967 | Prest | 464/30 X |
| 3,593,542 A | * | 7/1971 | Urayama | 464/37 |
| 3,877,259 A | * | 4/1975 | Bishop | 464/37 |
| 3,929,392 A | * | 12/1975 | Ogino | |
| 3,980,352 A | * | 9/1976 | Carlson | |
| 4,006,787 A | * | 2/1977 | Rumpp et al. | 464/37 X |
| 4,043,437 A | * | 8/1977 | Taylor | 464/37 X |
| 6,443,846 B1 | * | 9/2002 | Dziedzic et al. | 464/41 |
| 2001/0027134 A1 | * | 10/2001 | Ota et al. | 464/37 |

FOREIGN PATENT DOCUMENTS

JP 05248448 A * 9/1993 ............ 464/37
WO WO 2008010052 A2 * 1/2008

* cited by examiner

*Primary Examiner* — Gregory Binda
*Assistant Examiner* — Matthieu Setliff
(74) *Attorney, Agent, or Firm* — Altis Law Group, Inc.

(57) ABSTRACT

A transmission device includes a holder, a pivot shaft, and an elastic member. The holder defines a receiving hole. The pivot shaft is received in the receiving hole. The elastic member is received in the receiving hole, fixed to the holder, and tightly enfolds the pivot shaft. When torques applied to the holder or the pivot shaft are larger than a predetermined value, the elastic member is deformed such that the pivot shaft rotates relative to the holder.

2 Claims, 8 Drawing Sheets

TRANSMISSION DEVICE HAVING OVERLOAD PROTECTION

BACKGROUND

1. Technical Field

The present disclosure relates to transmission devices, and particularly to a transmission device having an overload protection mechanism.

2. Description of Related Art

When a transmission of a motor is overloaded it will blow a fuse. To replace the fuse is time consuming and inconvenient.

Therefore, it is desirable to provide a transmission device which can overcome the above-mentioned problems.

BRIEF DESCRIPTION OF THE FIGURE

Many aspects of the present transmission device can be better understood with reference to the accompanying drawings. The components in the drawings are not necessarily drawn to scale, the emphasis instead being placed upon clearly illustrating the principle of the present transmission device.

DETAILED DESCRIPTION

Embodiments of the present disclosure will now be described in detail with reference to the drawings.

Figure 1:
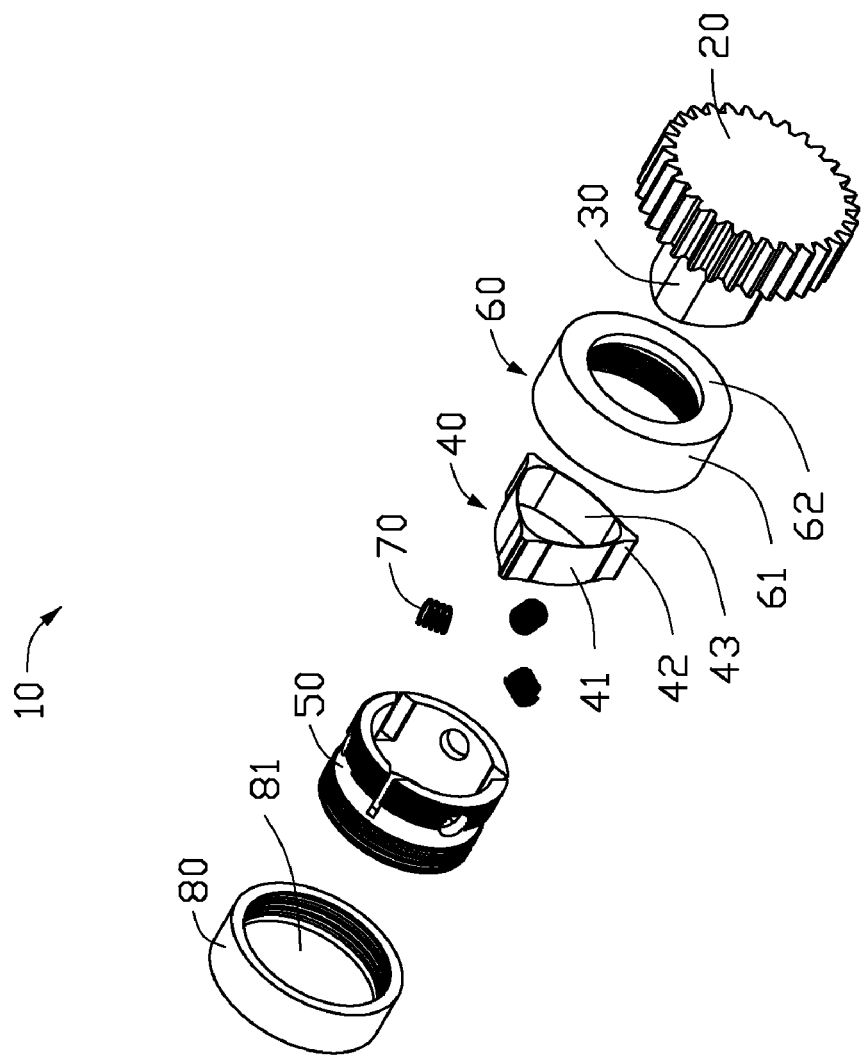
FIG. 1 is an exploded isometric view of a transmission device according to a first exemplary embodiment.
Figure 2:
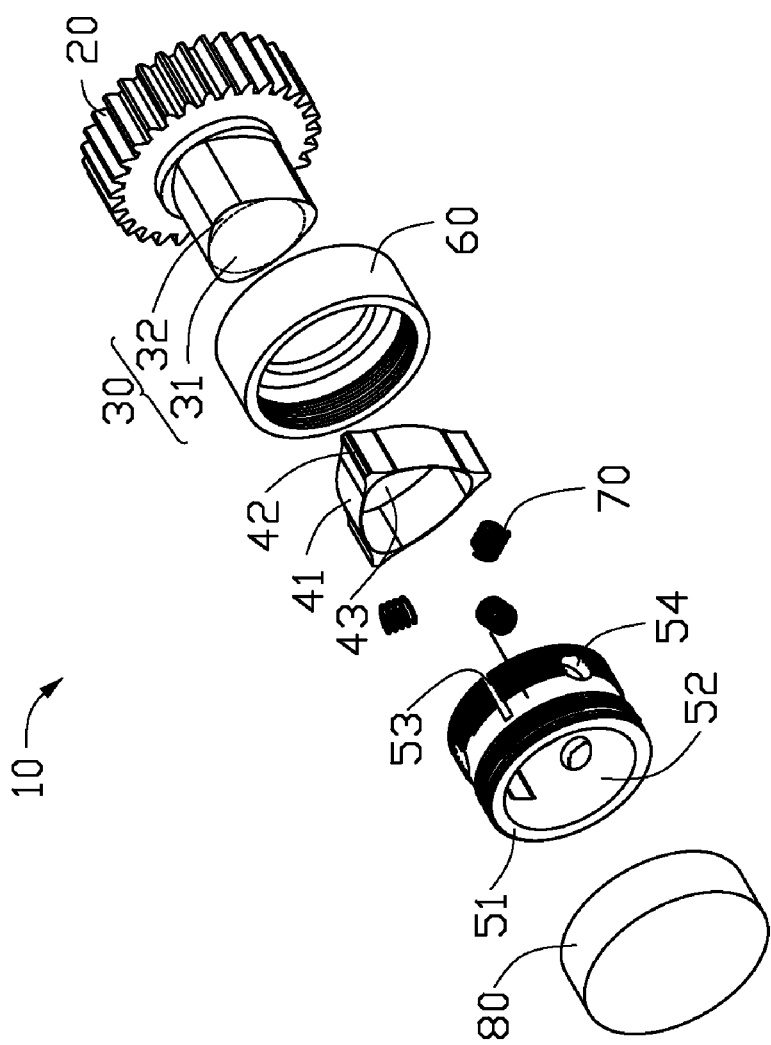
FIG. 2 is an exploded isometric view of the transmission device of FIG. 1, viewed from a reverse aspect.

Referring to FIGS. 1-2, a transmission device 10, according to a first exemplary embodiment, includes a gear 20, a pivot shaft 30, an elastic member 40, a holder 50, a positioning member 60, three springs 70, and a silencer 80. The transmission device 10 is configured to interconnect a driving device and a driven device (not shown), and transmit driving forces from the driving device to the driven device.

The gear 20 is operable to couple to the driving device (or the driven device).

The pivot shaft 30 is fixed on a center of the gear 20. The pivot shaft 30 includes a cylindrical inner body 31 and three arc-shaped positioning portions 32 protruding from a side surface of the inner body 31. In this embodiment, the inner body 31 and the positioning portions 32 are integrally formed, and the positioning portions 32 are distributed around the side surface of the inner body 31 at uniform intervals. As a result, the pivot shaft 30 is substantially triangular.

The elastic member 40 is a hollow frame, and includes a substantially triangular periphery. In particular, the elastic member 40 defines a substantially triangular pivot hole 43 in a center thereof to sleeve on the pivot shaft 30. In this embodiment, the elastic member 40 includes three arc-shaped spring plates 41 and three connecting portions 42 interconnecting the spring plates 41 correspondingly. The spring plates 41 are elastically deformable. The connecting portions 42 are disposed at three corners of the triangle correspondingly.

The holder 50 is tubular and configured to couple to the driven device (or the driving device). The holder 50 includes a cylindrical wall 51 and defines a receiving through hole 52 along a central axis of the cylindrical wall 51. The holder 50 further defines three fixing slots 53 and three positioning through holes 54 in the body 51. The fixing slots 53 and the positioning through holes 54 communicate with the receiving through hole 52. The fixing slots 53 are defined from one end of the cylindrical wall 51. A central axis of the positioning through hole 54 is substantially perpendicular to that of the receiving through hole 52. Each positioning through hole 54 is substantially located midway between two fixing slots 53, and faces the other fixing slot 53. The receiving through hole 52 is configured to receive the elastic member 40, and the fixing slots 53 are configured to receive the connecting portions 42 correspondingly. The positioning through holes 54 are configured to receive the springs 70 correspondingly.

The positioning member 60 includes a tube 61 and a positioning ring 62 disposed on one end of the tube 61. In this embodiment, the positioning member 60 is made of an acoustic insulating material.

Each spring 70 is received in a corresponding positioning through hole 54, and the length of the spring 70 in a normal state is longer than the depth of the corresponding positioning through hole 54.

The silencer 80 is a cylindrical body defining a blind hole 81 in the center thereof. In this embodiment, the silencer 80 is made of an acoustic insulating material.

Figure 3:
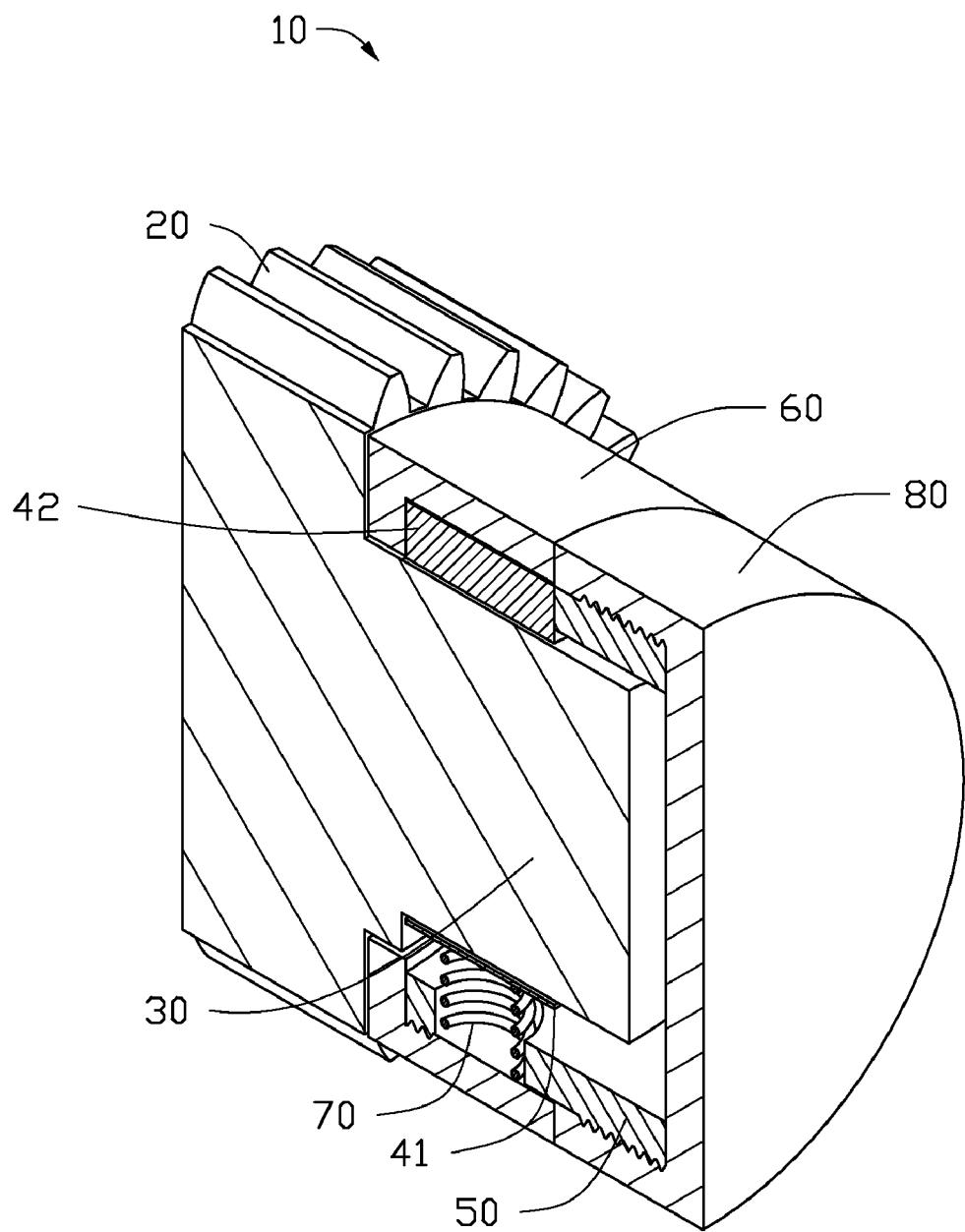
FIG. 3 is an assembled, cross-sectional, schematic view of the transmission device of FIG. 1.

Also referring to FIG. 3, in assembly, one end of the holder 50, which is away from the fixing slots 53 is received in the blind hole 81. The elastic member 40 is received in the receiving through hole 51, and the connecting portions 42 are inserted into the fixing slots 53 correspondingly. Each spring plate 41 faces a corresponding positioning through hole 54, and is spaced a distance away from the inner surface of holder 50. Then, the springs 70 are inserted into the positioning through holes 54 and contact the spring plates 41 correspondingly. In this embodiment, the positioning member 60 and the silencer 80 are screwed onto the holder 50.

The positioning ring 61 covers on the elastic member 40 to prevent the elastic member 40 from detaching from the holder 50. At the same time, the springs 70 are compressed by the positioning member 60 to apply pressure to the spring plates 41. Then, the pivot shaft 30 is inserted into the pivot hole 43, and is tightly enfolded by the elastic member 40. The connecting portions 42 tightly contact the positioning portions 32 correspondingly. The gear 20 extends out from the positioning member 60.

If an acceptable torque is applied by the driving device to the gear 20, the gear 20 and the holder 50 rotate synchronously due to the resisting torque applied by the spring plates 41 to the positioning portions 32. However, if the driving device is overloaded, i.e., torque applied to the gear 20 and the holder 50 are sufficiently large to overcome the resisting torque, then the spring plates 41 are forced by the positioning portions 32 to deform. Thereby, the elastic member 40 fails to keep up with the pivot shaft 30 during rotation, in other words the pivot shaft 30 rotates relative to the elastic member 40. In this way, the driving device is prevented from being damaged under overloaded conditions. When the pivot shaft 30 rotates relative to the elastic member 40, the noise generated by the pivot shaft 30 and the elastic member 40 are minimized by the positioning member 60 and the silencer 80. When the overloaded condition is minimized, the elastic member 30 recovers to catch up the pivot shaft 30 again.

Figure 4:
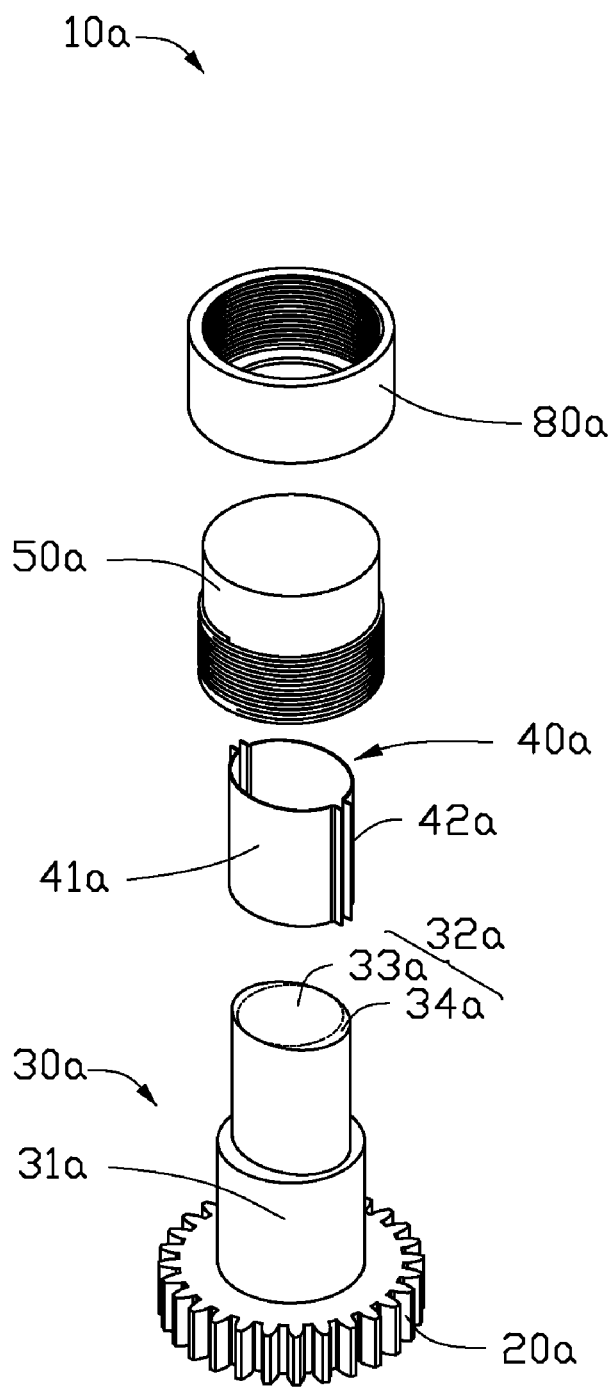
FIG. 4 is an exploded isometric view of a transmission device according to a second exemplary embodiment.
Figure 5:
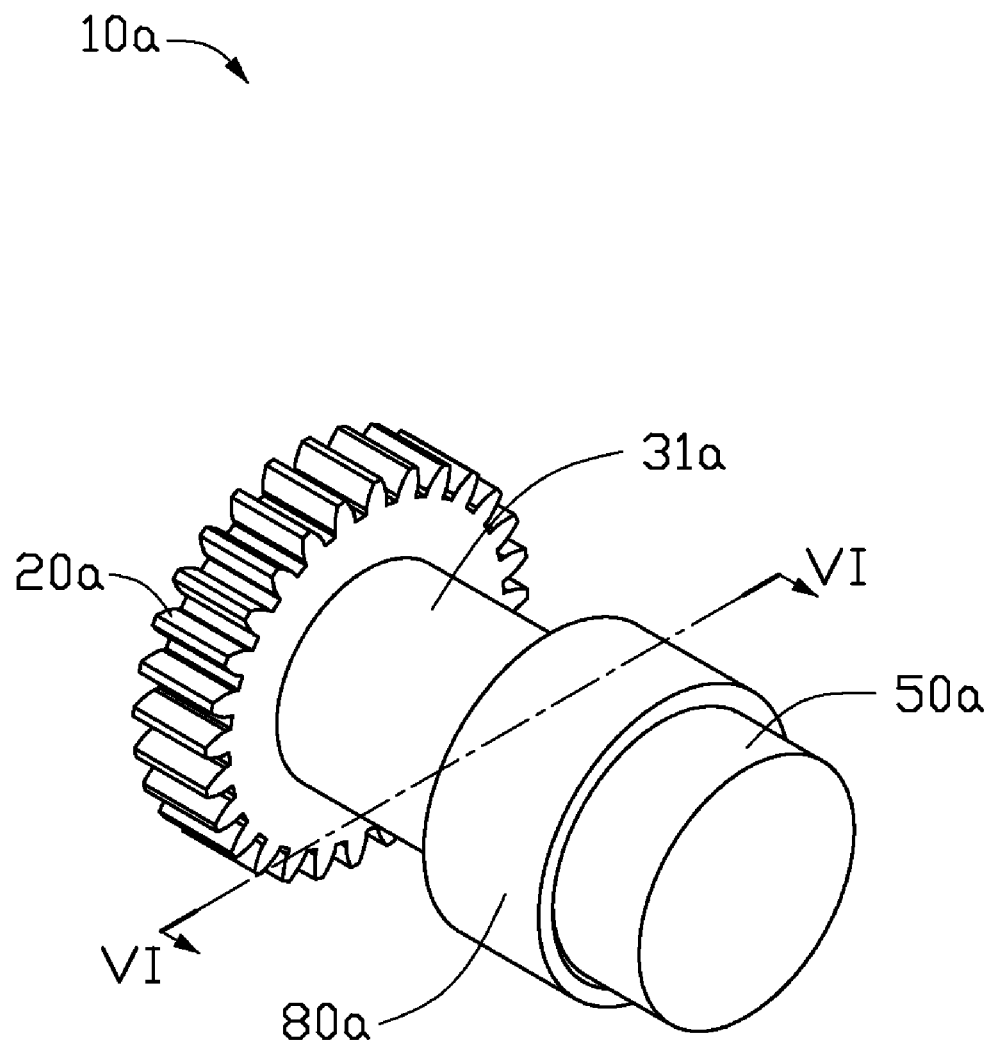
FIG. 5 is an assembled isometric view of the transmission device of FIG. 4.
Figure 6:
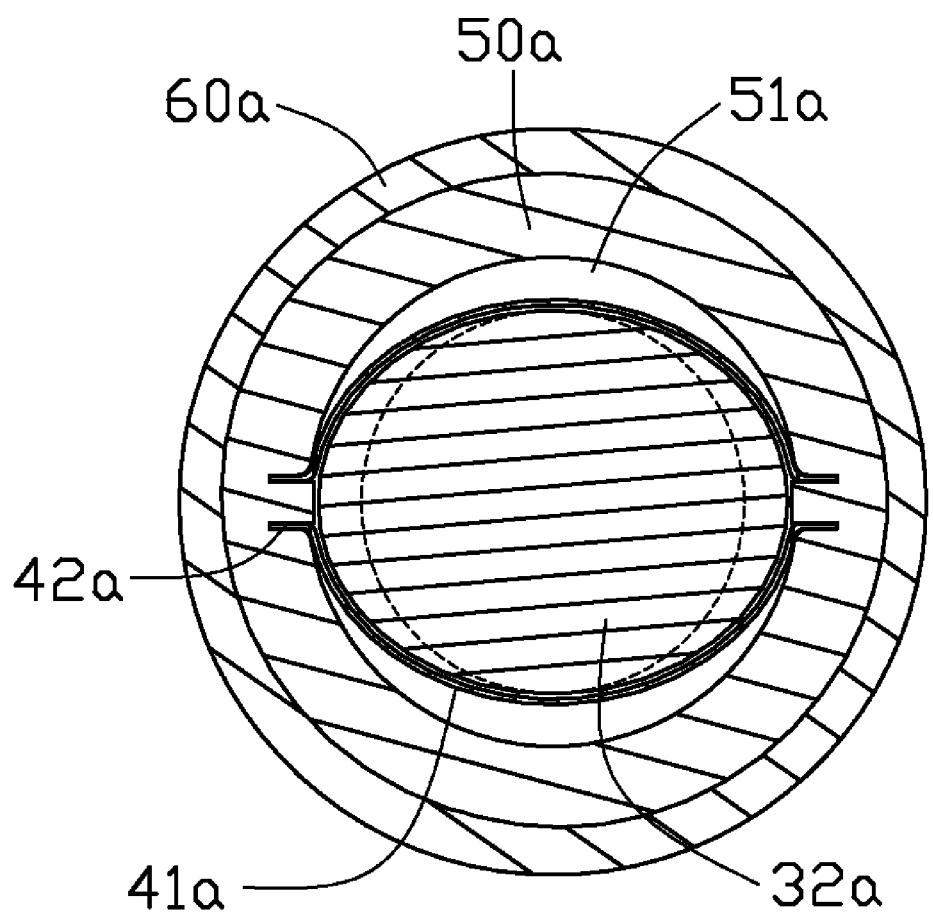
FIG. 6 is an assembled, cross-sectional, schematic view of the transmission device taken along VII-VII line of FIG. 5.

Referring to FIGS. 4-6, a transmission device 10a, according to a second exemplary embodiment, includes a gear 20a, a pivot shaft 30a, an elastic member 40a, a holder 50a, and a silencer 80a.

The gear 20a is configured to couple to a driving device (or a driven device, not shown).

The pivot shaft 30a includes a lower portion 31a fixed to a center of the gear 20a, and an upper portion 32a concentrically fixed to the lower portion 31a. The upper portion 32a includes a cylindrical inner body 33a and two arc-shaped positioning portions 34a. In this embodiment, the inner body 33a and the positioning portions 34a are integrally formed, and the positioning portions 34a protrude from a side surface of the inner body 33a. As a result, the upper portion 32a is substantially elliptical.

The elastic member 40a includes two arc-shaped spring plates 41a. Each spring plate 41a includes two fixing portions 42a disposed at two ends thereof. The elastic member 40a is configured to tightly enfold the upper portion 32a.

The holder 50a is configured to couple to a driven device (or a driving device, not shown). The holder 50a includes a cylindrical body and defines a receiving blind hole 51a (shown in FIG. 6) in a center of the body. The holder 50a defines four grooves (not labeled) in the inner surface of the body for receiving the fixing portions 42a. The holder 50a also includes male screw threads (not labeled) in the outer surface thereof.

The silencer 80a is a cylindrical shaped tube and includes female screw threads (not labeled) in the inner surface thereof. The silencer 80a is configured to sleeve on the holder 50a for eliminating noise. In this embodiment, the silencer 80a is made of an acoustic insulating material.

In assembly, the elastic member 40a tightly enfolds the upper portion 32a. The holder 50a is sleeved on the elastic member 40a, and the fixing portions 42a are inserted into the grooves in the inner surface of the holder 50a. There are gaps between the spring plates 41a and the inner surface of the holder 50a, so as to allow the spring plates 41a to deform along the radial direction of the blind pivot hole 51a. The silencer 80a is sleeved on the holder 50a to minimize noise generated by the transmission device 10a.

Similar to the transmission device 10, if the driving device coupled with the gear 20a is overloaded, then the spring plates 41a are forced by the positioning portions 34a to deform, such that the pivot shaft 30a rotates relative to the elastic member 40a and the holder 50a. Otherwise, the gear 20a, the pivot shaft 30a, the elastic member 40a and the holder 50a rotate synchronously.

Figure 7:
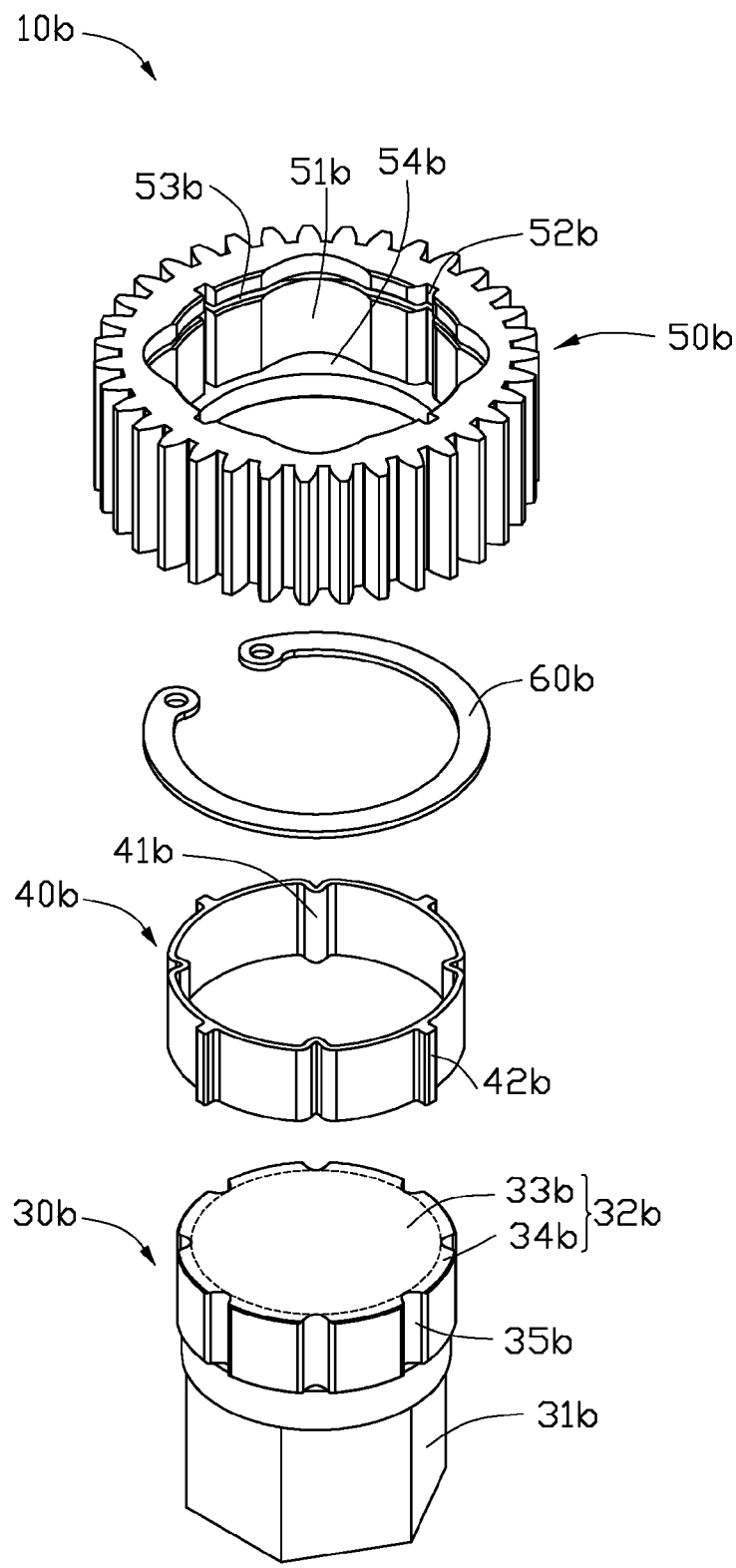
FIG. 7 is an exploded isometric view of a transmission device according to a third exemplary embodiment.

Referring to FIG. 7, a transmission device 10b, according to a third exemplary embodiment, includes a pivot shaft 30b, an elastic member 40b, a holder 50b, and a C-shaped positioning member 60b.

The pivot shaft 30b includes a lower portion 31b and an upper portion 32b concentrically fixed to the lower portion 31b. The lower portion 31b is a hexagonal column in shape, and is configured to connect to a driven device (or a driving device, not shown). The upper portion 32b includes a cylindrical inner body 33b and a number of positioning portions 34b protruding from a side surface of the inner body 33b. The positioning portions 34b are distributed around the side surface of the inner body 32b at uniform intervals, so as to define a number of positioning grooves 35b.

The elastic member 40b is a cylindrical tube in shape. The elastic member 40b includes a number of spring portions 41b and fixing portions 42b. The spring portions 41b are arc-shaped and protrude inwardly from an inner surface of the elastic member 40b. The fixing portions 42b are ribs protruding from an outer surface of the elastic member 40b.

The holder 50b is a gear configured to couple to a driving device (or a driven device, not shown). The holder 50b defines a receiving through hole 51b in the center thereof for receiving the elastic member 40b. The holder 50b further defines a number of fixing grooves 52b and a circular holding groove 53b in the inner surface thereof. The fixing grooves 52b extend along an axial direction of the receiving through hole 51b. The circular holding groove 53b is adjacent to one end of the holder 50b, and a radial direction of the circular holding groove 53b is perpendicular to the axial direction of the receiving through hole 51b. The holder 50b further includes a ring-shaped stopper 54b disposed at one end of the holder 50b away from the circular holding groove 53b. The stopper 54b is configured to close one end of the fixing grooves 52b.

Figure 8:
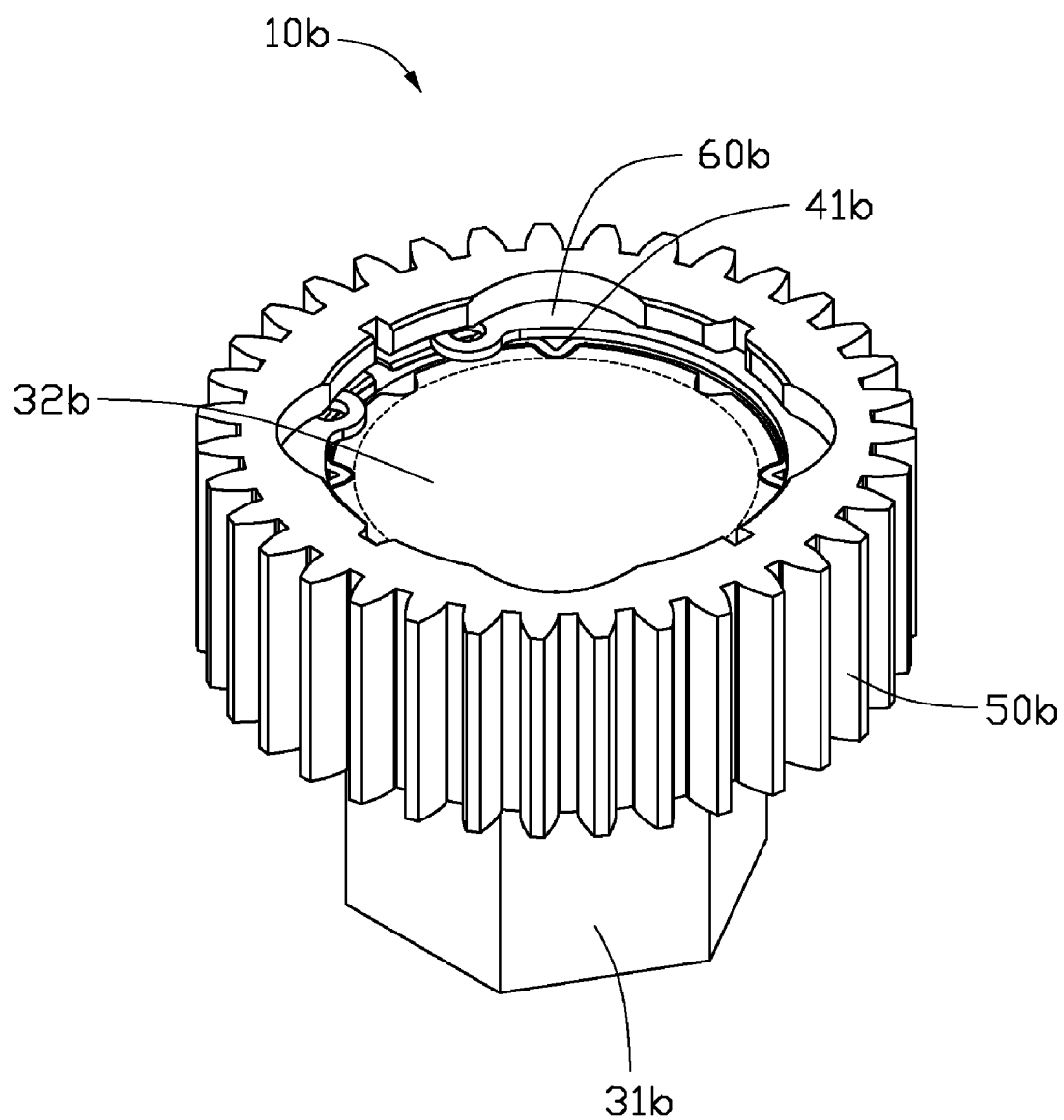
FIG. 8 is an assembled isometric view of the transmission device of FIG. 7.

Referring to FIG. 8, in assembly, the elastic member 40b is inserted into the holder 50b from one end of the holder 50b away from the stopper 54b, and is stopped by the stopper 54b. The fixing portions 42b are inserted into the fixing grooves 52b to fix the elastic member 40b in position. Then, the pivot shaft 30b is inserted though the elastic member 40b. The lower portion 31b extends out from the holder 50b, and the positioning portions 34b are stopped by the stopper 54b. The spring portions 41b are inserted into the positioning grooves 35b correspondingly, such that the elastic member 40b tightly enfolds the upper portion 32b. Finally, the positioning member 60b is received in the holding groove 53b and contacts the elastic member 40b and the upper portion 32b, so as to prevent the elastic member 40b and the pivot shaft 30b from detaching from the holder 50b.

Similarly as described above with respect to the transmission devices 10 and 10a, if the driving device is overloaded, then the spring portions 41b are forced by the positioning portions 34b to deform, such that the pivot shaft 30b rotates relative to the elastic member 40b and the holder 50b. Otherwise, the pivot shaft 30b, the elastic member 40b and the holder 50a rotate synchronously.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A transmission device, comprising:
   a holder defining a receiving hole;
   a substantially triangular pivot shaft received in the receiving hole;
   an elastic member received in the receiving hole, the elastic member being fixed to the holder, defining a substantially triangular hole and tightly enfolding the triangular pivot shaft that is inserted into the triangular hole; and
   a silencer, the silencer being sleeved on the holder to minimize noise generated by the triangular pivot shaft and the elastic member;
   wherein when torques applied to the holder or the triangular pivot shaft are larger than a predetermined value, the elastic member is deformed such that the triangular pivot shaft rotates relative to the holder.

2. The transmission device of claim 1, wherein the silencer is made of an acoustic insulating material.

* * * * *

UNITED STATES PATENT AND TRADEMARK OFFICE
CERTIFICATE OF CORRECTION

PATENT NO. : 8,313,384 B2  Page 1 of 1
APPLICATION NO. : 12/569858
DATED : November 20, 2012
INVENTOR(S) : Song-Ling Yang and Jin-Shi Lai It is certified that error appears in the above-identified patent and that said Letters Patent is hereby corrected as shown below:

Title page, item (30), insert

-- (30)    Foreign Application Priority Data
   Jul. 13, 2009   (CN) ......................200910304303.1 --

Signed and Sealed this
Twenty-sixth Day of November, 2013

Margaret A. Focarino
*Commissioner for Patents of the United States Patent and Trademark Office*